United States Patent
Driscoll et al.

(10) Patent No.: US 11,104,330 B2
(45) Date of Patent: Aug. 31, 2021

(54) SYSTEMS AND METHOD FOR CONTROLLING A VEHICLE

(71) Applicant: Autonomous Stuff, LLC, Morton, IL (US)

(72) Inventors: Joseph Driscoll, Morton, IL (US); Joshua Whitley, Morton, IL (US); Nathan Imig, Morton, IL (US); Terry Lamprecht, Morton, IL (US); Joseph Buckner, Morton, IL (US); Robert Hambrick, Morton, IL (US)

(73) Assignee: Autonomous Stuff, LLC, Morton, IL (US)

( * ) Notice: Subject to any disclaimer, the term of this patent is extended or adjusted under 35 U.S.C. 154(b) by 448 days.

(21) Appl. No.: 15/814,152

(22) Filed: Nov. 15, 2017

(65) Prior Publication Data
US 2019/0143965 A1    May 16, 2019

(51) Int. Cl.
*G05D 1/00* (2006.01)
*B60W 30/09* (2012.01)

(52) U.S. Cl.
CPC .......... *B60W 30/09* (2013.01); *G05D 1/0022* (2013.01); *G05D 1/0027* (2013.01); *G05D 1/0038* (2013.01)

(58) Field of Classification Search
CPC ... B60W 30/09; G05D 1/0038; G05D 1/0022; G05D 1/0027; G05D 1/00
USPC .................................. 701/41, 23, 25; 700/13
See application file for complete search history.

(56) References Cited

U.S. PATENT DOCUMENTS

| | | | | |
|---|---|---|---|---|
| 8,857,530 | B2 * | 10/2014 | Henry | A01B 63/114 172/4 |
| 2010/0094496 | A1 * | 4/2010 | Hershkovitz | B60L 3/12 701/22 |
| 2010/0125384 | A1 * | 5/2010 | Wyatt | B60K 7/0007 701/22 |
| 2011/0288695 | A1 * | 11/2011 | Gariepy | G05D 1/0027 701/2 |
| 2012/0227992 | A1 * | 9/2012 | Henry | A01B 63/114 172/4 |
| 2013/0103236 | A1 * | 4/2013 | Mehrgan | B60Q 1/00 701/22 |
| 2013/0325242 | A1 * | 12/2013 | Cavender-Bares | A01C 21/005 701/25 |
| 2016/0167653 | A1 * | 6/2016 | Malone | B60W 10/10 701/23 |

(Continued)

OTHER PUBLICATIONS

International Search Report and Written Opinion, International Application No. PCT/US2018/061230, dated Mar. 14, 2019, 14 pages.

*Primary Examiner* — Shardul D Patel
(74) *Attorney, Agent, or Firm* — Quarles & Brady LLP (57) ABSTRACT

Systems and method for controlling a vehicle are provided. In some aspects of the disclosure, a system includes a device interface configured to receive instructions from an external device, and a control interface configured to receive sensor signals from one or more vehicle sensors. The system also includes a controller module in communication with the device interface and control interface, wherein the controller module is configured to carry out steps for generating control signals based on the instructions received, and selectively directing the control signals or the sensor signals to at least one control unit on the vehicle.

26 Claims, 5 Drawing Sheets

(56) References Cited

U.S. PATENT DOCUMENTS

| | | | |
|---|---|---|---|
| 2016/0362116 A1* | 12/2016 | Otsuka | B60W 50/0098 |
| 2017/0057520 A1* | 3/2017 | Letwin | G05D 1/0061 |
| 2017/0160738 A1* | 6/2017 | Ganz | G05D 1/0022 |
| 2017/0190366 A1* | 7/2017 | Steben | B62D 33/06 |
| 2017/0269593 A1* | 9/2017 | Letwin | B60W 50/08 |

* cited by examiner

SYSTEMS AND METHOD FOR CONTROLLING A VEHICLE

BACKGROUND

The present disclosure relates generally to systems and methods for controlling vehicles, equipment and machines, in particular, to systems and methods for by-wire control.

Operation of equipment, machines and vehicles without direct input from a user represents a major area of research and development that spans many industries, including automotive, aviation, military, robotics and others. Examples include remote applications, where a user is removed from the vehicle he controls, and autonomous applications, where the user might observe or supervise an independently functioning vehicle and only assume control in case of emergency.

An important aspect of user-free operation includes the ability to engage in "by-wire" control via electronic instructions that can direct and coordinate various operational components of the equipment, machine or vehicle. Particularly in the automotive industry, by-wire technologies allow vehicle functions, such as acceleration, steering and braking, to be performed based on activation of electronic sensors rather than mechanical or hydraulic linkages. For instance, sensor signals corresponding to pedal engagement or steering wheel movement by an operator can be used to activate motors that can then apply the brakes, or control steering and throttle.

In some autonomous vehicle applications, by-wire technologies are used to directly read vehicle sensors and execute specific vehicle functions using external control systems, including hand-held controllers, computers and various devices running various applications. However, many such control systems are specifically configured to integrate with the electronics and sensors of a few commercial vehicles. Requiring customized hardware, software and components, the process of retrofitting vehicles with autonomous operation capabilities is often expensive due to the unique requirements of each vehicle model. Furthermore, such autonomous vehicle control systems may not be easily transferred to other vehicles or models due to the different features and standards of operation.

Given the above, there is a clear need for improved technologies that may be applied universally to a variety of equipment and vehicle platforms, and allow safe and reliable transfer between by-wire and user control.

SUMMARY

The present disclosure provides systems and a method for controlling vehicles that overcome the drawbacks of previous technologies. Features and advantages of the present disclosure will become apparent from the following description.

In accordance with one aspect of the disclosure, a system for controlling a vehicle is provided. The system includes a device interface configured to receive instructions from an external device, and a control interface configured to receive sensor signals from one or more vehicle sensors. The system also includes a controller module in communication with the device interface and control interface, wherein the controller module is configured to carry out steps for generating control signals based on the instructions received, and selectively directing the control signals or the sensor signals to at least one control unit on the vehicle.

In accordance with another aspect of the disclosure, a system for controlling a vehicle is provided. The system includes a device interface configured to receive instructions from an external device, a control interface configured to receive sensor signals from one or more vehicle sensors, and a fault module configured to detect a fault in the system. The system also includes a controller module in communication with the device interface, the control interface and fault module, wherein the controller module is configured to carry out steps for generating control signals based on the instructions received, and analyzing the sensor signals to identify input from an operator. The controller module is also configured to carry out steps for determining a mode of operation for the system in accordance with the input and the fault; and selectively directing the control signals or the sensor signals to at least one control unit on the vehicle based on the mode of operation.

In accordance with yet another aspect of the disclosure, a method for controlling a vehicle using a system is provided. The method receiving instructions for controlling a vehicle from an external device, and acquiring sensor signals from one or more vehicle sensors. The method also includes determining a mode of operation based on the instructions and the sensor signals, and selectively directing the sensor signals or control signals to at least one control unit on the vehicle based on the mode of operation.

BRIEF DESCRIPTION OF THE DRAWINGS

The present invention will hereafter be described with reference to the accompanying drawings, wherein like reference numerals denote like elements.

DETAILED DESCRIPTION

The present disclosure is directed to a novel platform for by-wire control that allows multi-modal operation and universality across various types of vehicles, equipment, machines, and so forth. In particular, the systems and methods provided include unique features that facilitate safe and reliable transfer of control based on input from an operator or due to the occurrence of a fault. As will become apparent from the description below, embodiments described herein may be advantageously utilized in a wide range of applications, including various vehicle, robotic, equipment and machine applications.

Figure 1:
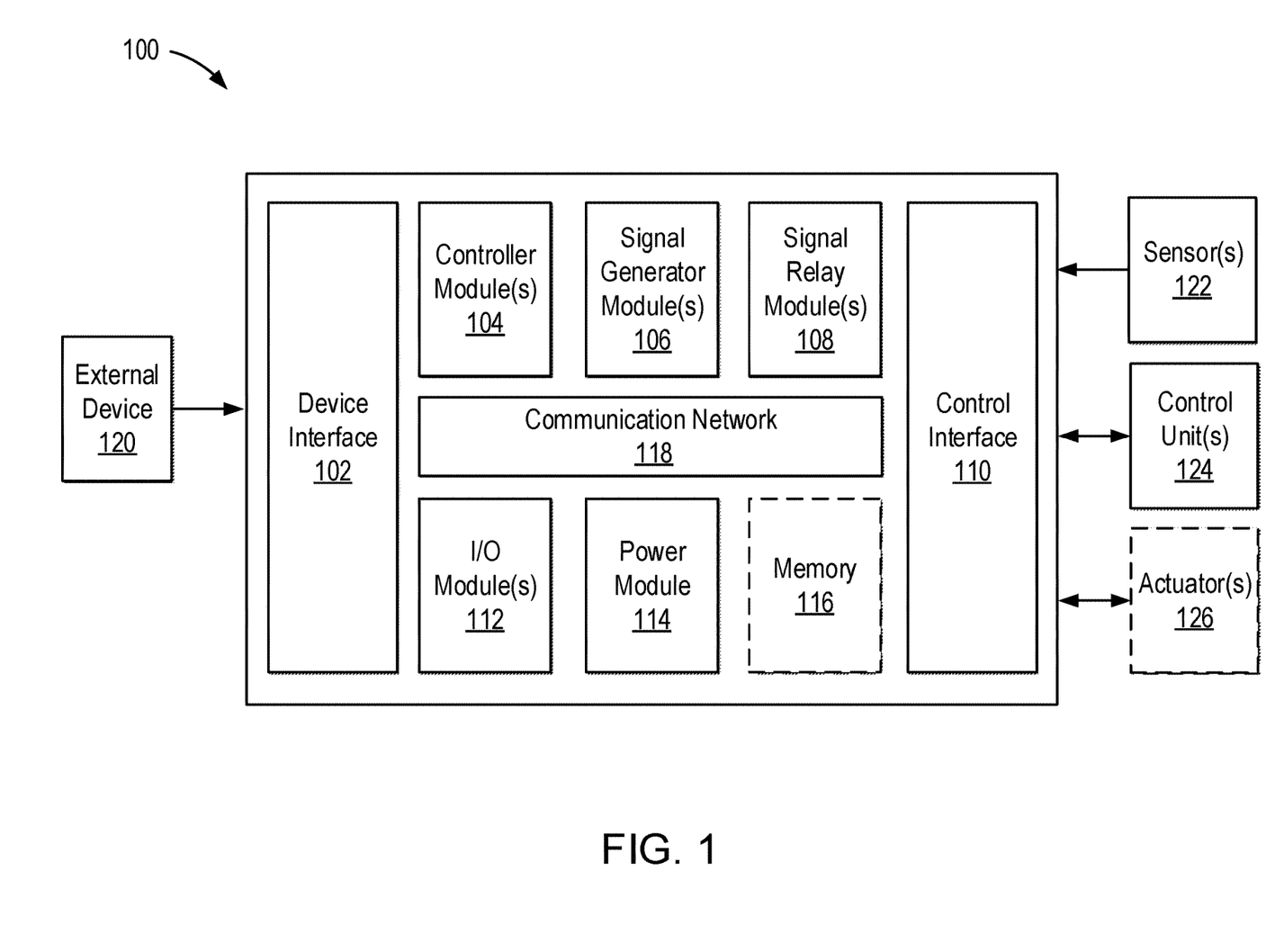
FIG. 1 is a schematic diagram of an example electronic system, in accordance with aspects of the present disclosure.
Figure 2:
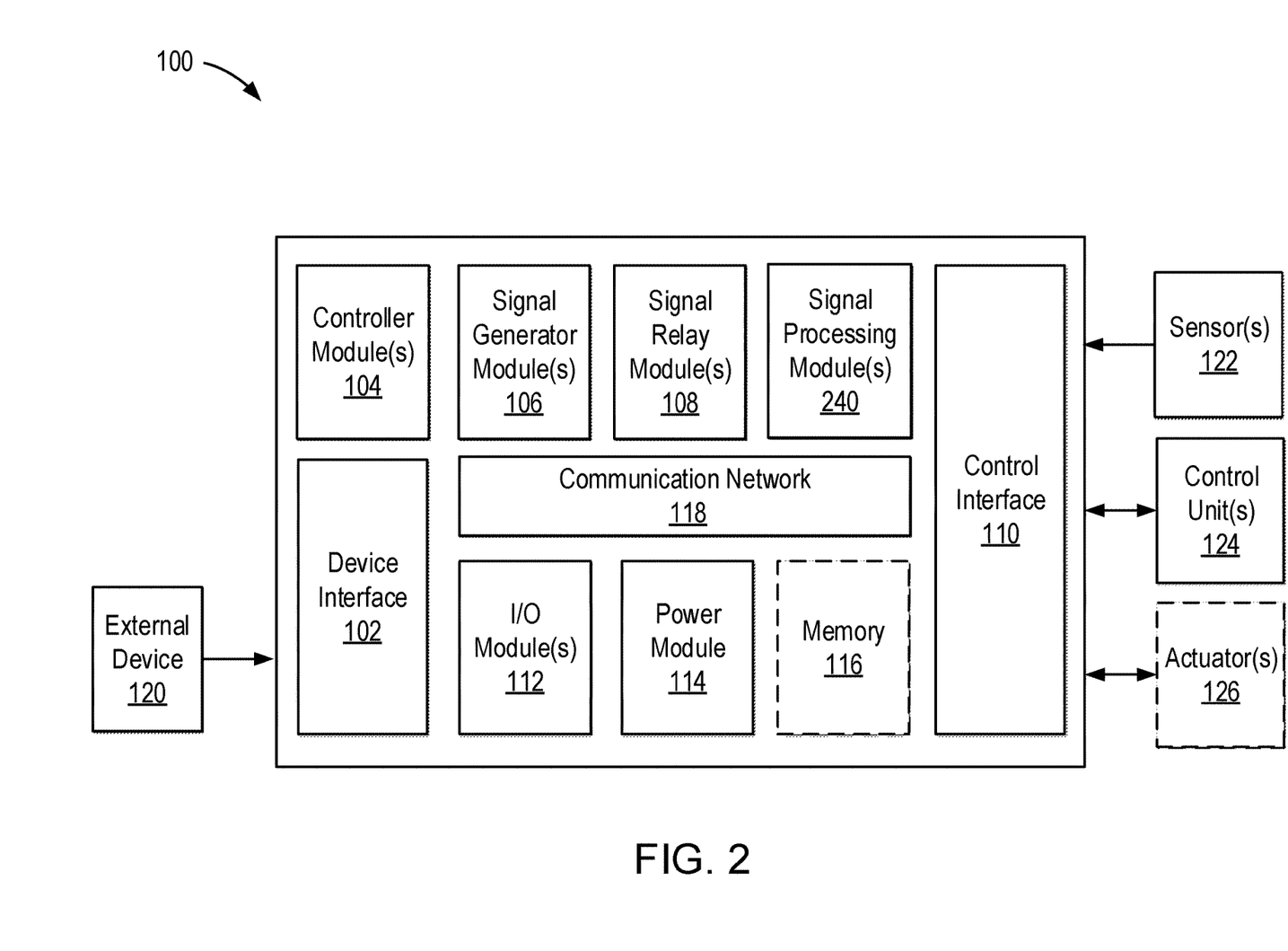
FIG. 2 is a schematic diagram of another example system, in accordance with aspects of the present disclosure.
Figure 3:
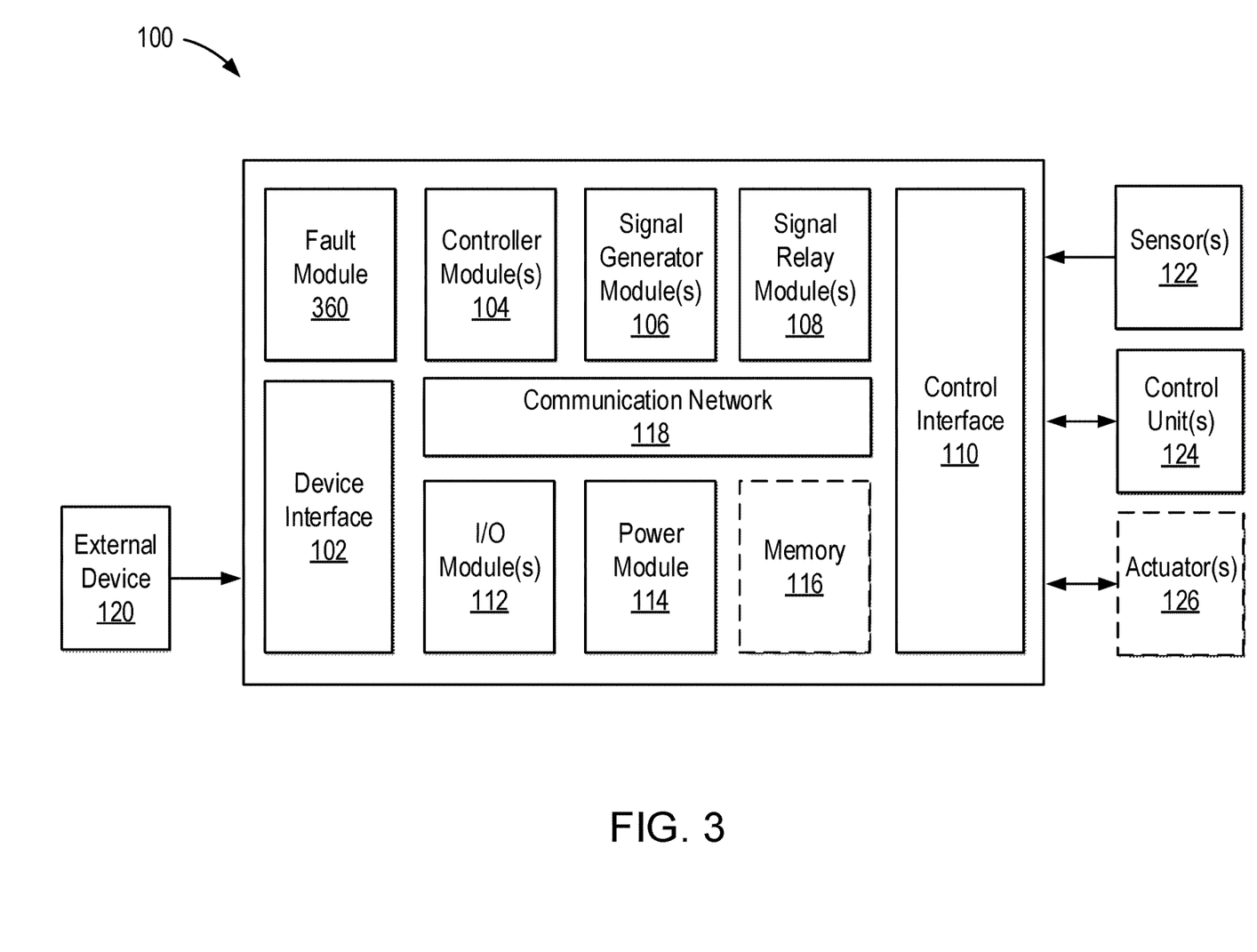
FIG. 3 is a schematic diagram of yet another example system, in accordance with aspects of the present disclosure.

Referring to FIGS. 1-3, schematic diagrams illustrating embodiments of an electronic system 100, in accordance with aspects of the present disclosure, are shown. As mentioned, the system 100 may be configured to function in cooperation with a vehicle, as well as various other equipment, machines, robots, and so on, benefiting from by-wire control. In some implementations, the system 100 may be configured to allow by-wire control in a remote or autonomous vehicle application. In general, a vehicle may include an automobile, an aircraft, a boat, a drone, a golf cart, and others.

The system 100 may generally include a device interface 102, one or more controller modules 104, one or more signal generator modules 106, one or more signal relay modules 108, and a control interface 110. The system 100 may also include one or more input/output (I/O) modules 112, a power module 114, and optionally a memory 116, as well as other elements and circuitry. A communication network 118 may be configured to facilitate the exchange of data, signals and information between the various elements of the system 100.

The device interface 102 allows communication with an external device 120 that is configured to provide operational instructions, data, and other information to the system 100. By way of example, the external device 120 may include one or more of a personal computer, laptop, tablet, smartphone, personal digital assistant ("PDA"), as well as other devices or systems such as joysticks, hand-held controllers, steering elements, throttle elements, braking elements, gear elements, signal elements, pedals, and so forth. Communication with the external device 120 may be achieved using a wireless or wireless communication protocol, such as WiFi, Bluetooth and others. In some implementations, the external device 120 may run applications or software for autonomous operation of a vehicle, machine or equipment. In addition, the external device 120 may be configured to generate and provide to the system 100 Controller Area Network ("CAN") messages, including mode command messages indicating whether the system 100 operates in a manual mode or by-wire mode. The device interface 102 may then relay instructions, data, and information provided by the external device 120 to the controller module(s) 104 of the system 100. In addition, the device interface 112 may also be configured to receive and direct communication back to the external device 120, or another device, to provide various information or reports, including vehicle, equipment or machine feedback.

The controller module(s) 104 may be configured to carry out a variety of tasks to operate the system 100 either independently or based on instructions or feedback. As such, the controller module(s) 104 may include one or more processors or processing units, such as microcontrollers, microprocessors, central processing units ("CPUs"), graphical processing units ("GPUs") and so on. In addition, the controller module(s) 104 may also include one or more digital logic devices, including application specific integrated circuits ("ASICs"), field programmable gate arrays ("FPGAs)", digital signal processors ("DSPs") and others.

The controller module(s) 104 may be preprogrammed or hard-wired to carry out specific instructions and in accordance with methods of the present disclosure. Alternatively, or additionally, the controller module(s) 104 may receive or access programming and instructions from the external device 120, from the memory 116, or from another data storage location having non-transitory computer readable-media. To do so, the controller module(s) 104 may communicate with, and control, the signal generator module(s) 106, the signal generator module(s) 108, the control interface 110, the I/O modules 112, the power module 114 and optionally the memory 116. By way of the control interface 110, the controller module(s) 104 may receive signal data and messages from one or more sensor(s) 122, carry out various processing steps, and then direct one or more control unit(s) 124 and optionally one or more actuator(s) to carry out instructions, for example received from the external device 120, from an operator, or both. In some implementations, the controller module(s) 104 may determine, based on sensor signals, whether input was provided by an operator.

The signal generator module(s) 106 is/are in communication with the controller module(s) 104 and may be configured to generate a variety of signals, including various control signals for operating a vehicle, equipment or machine by-wire. For instance, the signal generator module(s) 106 may include a variety of hardware and circuitry configured to generate analog or digital signals, (e.g. current signals, voltage signals, and so on), as well as more complex signals, such as CAN signals or messages. To this end, the signal generator module(s) 106 may include various signal sources and integrated circuits, including current sources, voltage sources, digital-to-analog ("DAC") converters, analog-to-digital converters ("ADC"), pulse width modulation ("PWM") generators, digital voltage switches, digital pots, and so on. By way of example, the signal generator module(s) 106 may be configured to generate individual or varying voltage signals in a range approximately between 0 Volts and 5 Volts. In another example, the signal generator module(s) 106 may also be configured to generate digital on/off voltage levels approximately between −5.5 Volts to 12 Volts. In yet another example, the signal generator module(s) 106 may also be configured to generate digital communication messages, such as CAN communications. In yet another example, the signal generator module(s) 106 may also be configured to generate current signals in a range approximately between −100 mAmps and 100 mAmps.

The signal relay module(s) 108 is/are in communication with the controller module(s) 106 and may be configured to provide switching between sensor signals provided by a vehicle, equipment or machine and control signals corresponding to input from an external device 120 and/or operator. By way of example, the signal relay module(s) 108 may include one or more "make before break" relays, solid state switches, where the switches optionally include power off protection, as well as other signal relays.

The control interface 110 may be configured to send and receive a variety of data, signals and information. For instance, the control interface 110 may be configured to sense and receive sensor signals acquired by the sensor(s) 122, as well as transmit control signals to the control unit(s) 124 and the actuator(s) 126. Example sensor signals may include digital voltage levels, for instance approximately between 0 Volts to 5 Volts, analog voltages, for instance approximately between −5.5 Volts to 12 Volts, digital voltages from 0 Volts to 5 Volts, CAN communications, Pulse Width Modulation (PWM) signals, SPI bus signals, LIN bus signals, UART bus, reset signals, and so on.

In some vehicle applications, for example, the sensor(s) 122 may include a number of vehicle sensors, including gear selection sensors, throttle sensors, brake sensors, turn signal sensors, steering sensors and others. In vehicle and other applications, the sensor(s) 122 may also include temperature sensors, pressure sensors, acoustic sensors, visual sensors or cameras, and so forth. Similarly, the control unit(s) 124 on a vehicle may include various electronic control units ("ECUs"), including a shift ECU, a throttle ECU, a brake control ECU, a power steering ECU, a main body ECU, and so on. Furthermore, the actuator(s) 126 may include a number of elements, including linear actuators, rotary actuators, motors, pistons, and so on, configured to perform various mechanical functions, such as gear selection, parking brake engagement, and others. Such actuators(s) 126 may be mounted on the vehicle in any manner, depending upon the physical and spacing requirements. In some aspects, the control interface 110 is further configured to receive vehicle feedback, for instance as provided by the sensor(s) 122, control unit(s) 124, actuator(s) 126 or a vehicle CAN bus.

The I/O module(s) 112 may be configured to receive a variety of data, information, selections, and operational instructions from an external device 120 and/or an operator. To this end, the I/O module(s) 112 may also include various drives, receptacles and elements for providing input, including a touchpad, touch screen, buttons, switches, toggles, flash-drives, USB drives, CD/DVD drives, communication ports, modules and connectors, and so on. In one embodiment, the I/O module(s) 112 includes an emergency stop button for returning control of a vehicle, equipment or machine to an operator. The I/O module(s) 112 may also be configured to provide a report by way of various output elements, including screens, LEDs, LCDs, alarm sources and so on. In one embodiment, the I/O module(s) 112 may include one or more LEDs that can indicate a communication status, an operational status, a mode of operation or a system fault, such as a loss of power, or system error.

The power module 114 may be configured to provide power to various elements of the system 100. In some implementations, the power module 114 may receive power from the vehicle, equipment or machine being controlled by the system 100. Additionally, or alternatively, the power module 114 may include an internal source of power, including a rechargeable or replaceable battery.

As mentioned, the system 100 may optionally include a memory 116. The memory 116 may store a variety of information and data, including, for example, operational instructions, signal data, fault/error data, and so forth.

The communication network 118 may also include a variety of other communication capabilities and circuitry, including various hardware for electronic, radiofrequency ("RF"), optical and other communication methods. By way of example, the communication network 118 may include various controller area network (CAN) buses, parallel buses, serial buses, and combinations thereof. Example serial buses may include serial peripheral interface (SPI), I²C, DC-BUS, UNI/O, 1-Wire, and others. Example parallel buses may include ISA, ATA, SCSI, PIC, IEEE and others. In some implementations, the communication network 118 may include a single CAN bus.

Elements of the system 100 listed above may be contained in at least one housing configured to be removably positioned at various locations about a vehicle. This allows an after-market vehicle, for instance, to be retrofitted with by-wire control capabilities, in accordance with aspects of the present disclosure. Alternatively, the system 100, or various elements therein, may also be integrated into the design of the vehicle during the manufacturing process.

As described, the system 100 may be used to control a vehicle. As such, the controller module(s) 104 may be configured to control a vehicle by-wire using the sensor(s) 122, the control unit(s) 124 and the actuator(s) 126 installed or operating therein. Control of a vehicle, although not limiting, is described below.

In some embodiments, the controller module(s) 104 may include a primary controller module configured to receive sensor signals (e.g. pedal voltages) and sensor messages (e.g. CAN messages) from the sensor(s) 122 on the vehicle via the control interface 110. The controller module(s) 104 may include one or more secondary controller modules configured to control specific functions, control unit(s) 124 or actuator(s) 126. For example, a secondary controller module may be used to control a critical actuator, such as a gear shifting actuator, a throttle or brake pedal control actuator, a steering wheel control actuator, and so on.

The primary controller module may also receive instructions from an external device 120 and/or operator, via the device interface 102 and I/O module(s) 112. The instructions received may include a mode control message indicating a manual mode or a by-wire mode of operation using a communication bus corresponding to the communication network 118. For example, the mode control message could be a message for activating a remote reset switch or a CAN message for controlling the mode of the vehicle.

When a mode control message indicating manual control is received, the primary controller module may transmit sensor signals and sensor messages received from the sensor(s) 122 directly to the control unit(s) 124 on the vehicle without modification. To do so, the primary controller module may de-energize, or interrupt, relay signals applied to the signal relay module(s) 108. This would allow the sensor signals and messages to pass directly to the control unit(s) 124. Such implementation is advantageous because it ensures that control by an operator, namely a manual mode, is the default mode of operation of the system 100. For instance, if there is loss of power to the system 100, and hence the primary controller module, normal driving operation may be carried out safely.

When a mode control message indicating by-wire control is received, the primary controller module may direct the signal generator module(s) 106 to generate control signals based on instructions from the external device 102 and/or operator. The control signals may include analog signals, digital signals, CAN message signals and so on, depending upon the specific signal input required by the control unit 124 or actuator 126 on the vehicle. In some aspects, the primary controller module may direct the signal relay module(s) 108 to allow control signals by the signal generator module(s) 106 to be provided to the control unit(s) 124 and actuator(s) 126. Alternatively, the control signals may be directly transmitted by the signal generator module(s) 106.

In one non-limiting example of by-wire control, the primary controller module of the controller module(s) 104 may generate and send an SPI message to a digital-to-analog voltage integrated circuit ("IC") configured to generate analog voltage signals. The analog voltage signals may be directly transferred to corresponding control unit(s) 124 that are used to control the position of the throttle or brake. The primary controller module may also energize the signal relay module(s) 108 to allow the generated analog voltage signals to be directed to the control unit(s) 124. If a CAN message is required to control throttle or brake position, for example, a separate control board may be inserted in line with the vehicle CAN bus. This board may be notified of the state based on a command message that may include both a desired state of control and a desired command from the primary controller module. After a by-wire message is received from the primary controller module, the CAN message bytes may then be modified in any way needed by the separate control board, as appropriate, to produce a desired vehicle behavior (e.g., apply throttle). For example, a modification of the CAN message may include modification of the header information contained within the message or a modification of any of the message payload information.

If control of a physical actuator is required to control throttle or brake position, the primary controller module, or a signal generator module configured to provide control signals to the physical actuator, may generate and send the control signals to such physical actuator. In some aspects, the primary controller module may direct the signal generator module(s) 106 to provide control signals corresponding with calibrated ranges of motion for the physical actuator. The control signals may direct the physical actuator to perform the desired vehicle behavior (e.g. moving a throttle or brake pedal). Example control signals may include either analog voltages, PWM voltages, or digital communications (e.g. CAN messages).

By-wire control may be interrupted, and manual control returned, when input from an operator is sensed using the sensor(s) 122. For instance, manual control may be returned when the operator presses the throttle pedal or brake pedal, or provides torque to the steering wheel. As such, the primary controller module may interrupt relay signals to de-energize the signal relay module(s) 108 in order to resume the default mode of operation of the system 100, which includes transferring signals from the sensor(s) 122, as described.

In one variation, as shown in FIG. 2, the system 100 may also include one or more signal processing module(s) 240 in communication with the controller module(s) 104. The signal processing module(s) 240 may be configured to receive sensor signals from the sensors, and elsewhere, and process or analyze such signals, as desired. For example, the signal processing module(s) 240, in cooperation with the controller module(s) 104, may detect or identify whether input has been provided by an operator. The sensor signals may be received by the control interface 110 and transmitted using the communication network 118 to the signal processing module(s) 240. In some implementations, the signal processing module(s) 240 may include one or more amplifiers, dividers, filters, and other signal processing components and hardware. As an example, the signal processing module(s) 240 may receive an analog signal (e.g., a voltage signal) and adjust the voltage signal accordingly. This allows, for example, the primary controller module to receive a voltage or current signal from the signal processing module(s) 240 without risk of damage. In another example, a CAN message received from a vehicle can be modified, for instance, by modifying CAN message bytes, as instructed by the primary controller module, to effect a desired vehicle behavior (e.g., applying a throttle).

In another variation, as shown in FIG. 3, the system 100 may also include a fault module 360 in communication with the controller module(s) 104. The fault module 360 may include one or more microcontrollers or microprocessors configured to monitor a state of the system 100, and its various components, either intermittently or in real time. The fault module 360 may also include various digital logic devices, FPGAs, DSPs and components. In some aspects, the fault module 360 may be configured to detect component failure, communication error, loss of sensor signal, or loss of power. To this end, the controller module(s) 104 may communicate with the fault module 360 and return operation of the system 100 to a manual mode, as described above, if a fault is detected by the fault module 360. In addition, the fault module 360 may communicate with and direct the I/O module(s) 112 to indicate such fault, for instance, using audible or visual alarms or indicators. For example, LEDs may be activated to indicate various fault states.

Figure 4:
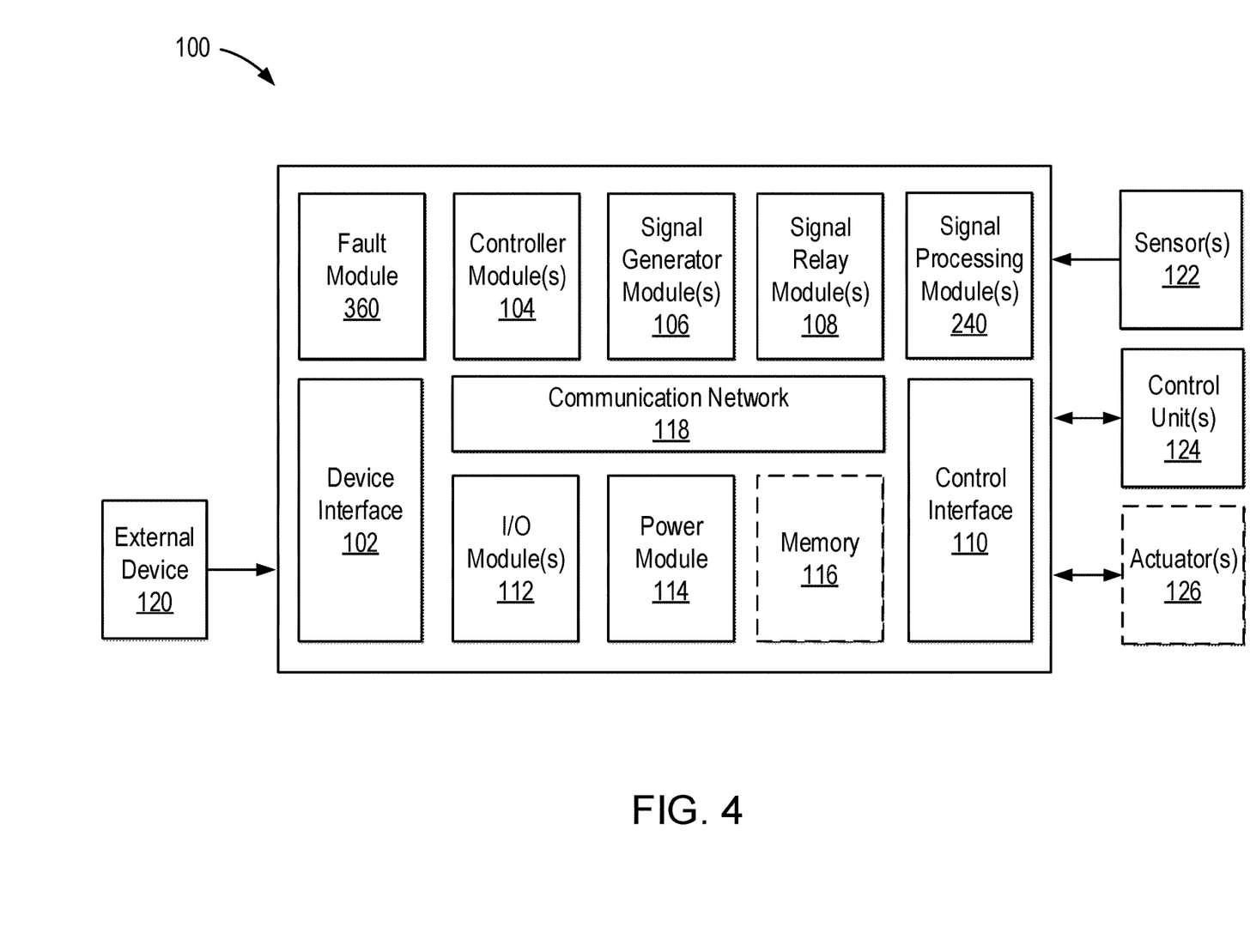
FIG. 4 is a schematic diagram of yet another example system, in accordance with aspects of the present disclosure.

In yet another variation, as shown in FIG. 4, the system 100 may include one or more signal processing module(s) 240 as described with reference to FIG. 2, and a fault module 360 as described with reference to FIG. 3.

In general, any combination or sub-combination of optional and non-optional elements described with reference to FIGS. 1-4 may be used in a variation of the system 100 described.

Figure 5:
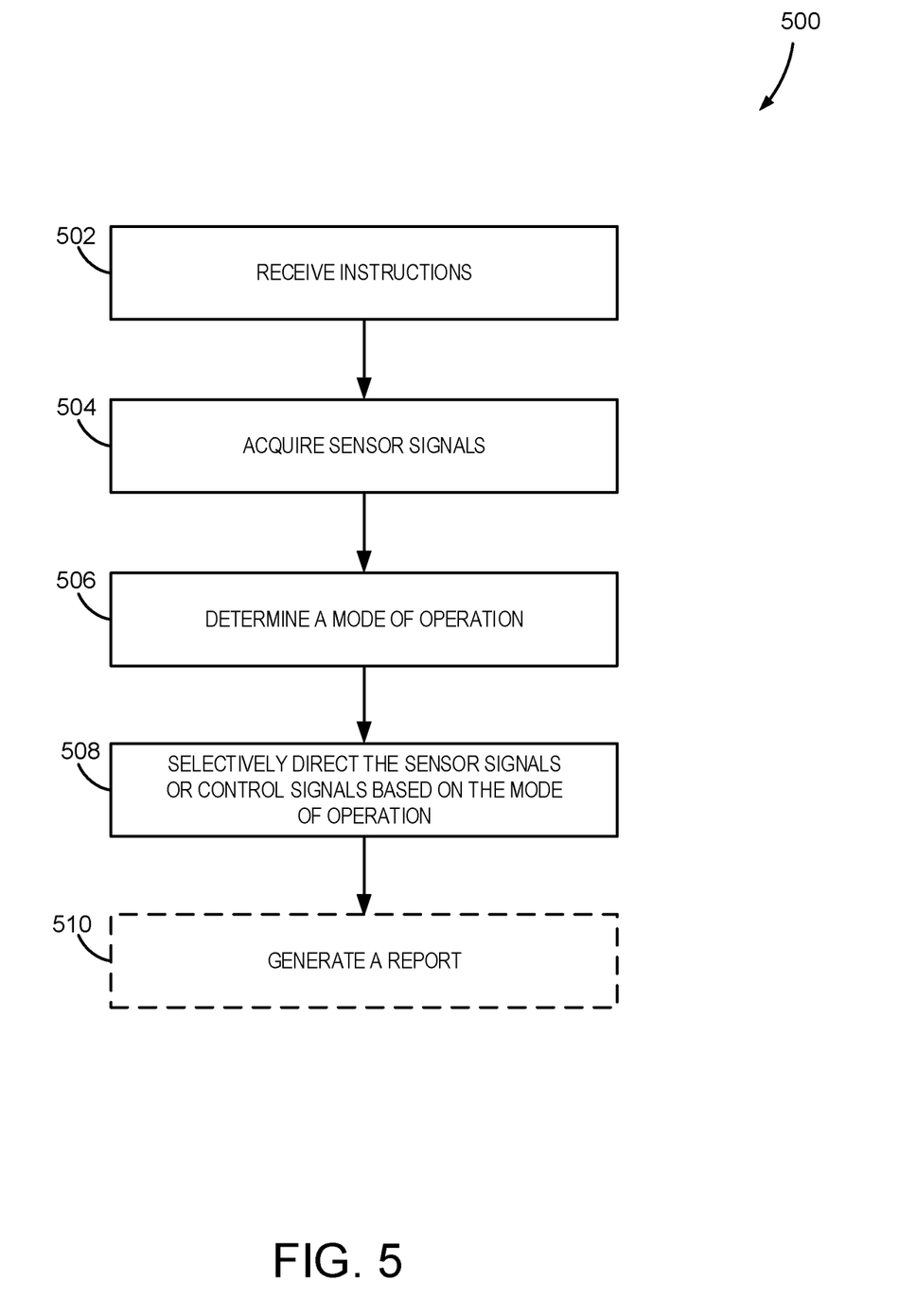
FIG. 5 is a flowchart setting forth steps of a process, in accordance with aspects of the present disclosure.

Turning now to FIG. 5, a flowchart setting forth steps of a process 500, in accordance with aspects of the present disclosure, is shown. The process 500 may be carried out using any suitable device, apparatus or system, such as the system 100 described with reference to FIGS. 1-4. In some aspects, the process 500, or various steps therein, may be implemented as a program or executable instructions stored in non-transitory computer readable media.

The process 500 may begin with receiving and processing instructions at process block 502. As described, such instructions may specify whether a manual or by-wire mode of operation is desired. The instructions may also include operational instructions for controlling various elements or components of a vehicle, equipment or machine. As such, control signals may be generated based on the operation instructions. In some aspects, a check may also be performed to determine whether a fault has occurred.

At process block 504, sensor signals may be acquired, either intermittently or in real time. As described, sensor signals may include analog signals, digital signals, CAN message signals, and others, depending on the specific sensor and control unit requirements. In some aspects, the acquired sensor signals may be analyzed and modified, as described. For example, voltage signals may be scaled, amplified, or filtered. Although shown as subsequent to process block 502, process block 504 may be performed before process block 502, as well as concurrently.

At process block 506, the mode of operation may be determined. In some aspects, the mode of operation may be determined based on instructions received from an external device. Alternatively, or additionally, the mode of operation may be determined based on input from an operator and/or a detected fault. For instance, if the operator, or an external device, sends a command request a by-wire mode of operation, and the operator is not operating the vehicle, equipment or machine, as determined from analyzed sensor signals, steps for by-wire control may be carried out, as described. For example, a primary electronic controller can either send a message (e.g., a CAN message), or generate and send a control signal to a control unit (e.g., an analog voltage), or send a control signal to an actuator (e.g., a linear actuator) to control throttle. However, if a fault is detected or if an operator requests, or takes over control of the vehicle, equipment or machine, a manual mode is determined.

Then, as indicated by process block 508, sensor signals or control signals may then be selectively directed based on the mode of operation. As described, a manual mode includes transferring sensor signals directly to control units or actuators, while a by-wire mode includes sending control signals to the control units or actuators.

A report may then be generated, as indicated by process block 510. The report may be in any form and provide any information. In particular, the report may indicate a mode of operation or a status, including a component failure, communication error, loss of sensor signal, or loss of power. For example, LEDs of various colors may be activated to indicate manual mode, by-wire mode, loss of power, and so on. The report may provide other information associated with the vehicle, equipment or machine being controlled. For example, the report may indicate a speed of a vehicle, tire pressure, engine rotation, temperature, and other information accessible from the sensors. As shown, the process 500 may be executed a number of times starting with process block 502, or process block 504, or both.

Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A system for controlling a vehicle, the system comprising:
   a device interface configured to receive instructions from an external device, the external device comprising a manual input device, and the device interface configured to communicate with the external device using a wireless communication protocol or over a controller area network;
   a control interface configured to receive sensor signals from one or more vehicle sensors; and
   a controller module in communication with the device interface and control interface, wherein the controller module is configured to carry out steps for:
      generating control signals based on the instructions received, and
      selectively directing the control signals or the sensor signals to at least one control unit on the vehicle,
   wherein the controller module is further configured to determine a mode of operation based on at least one of the instructions, input from an operator, or a fault associated with the system,
   wherein, when the instructions or the input from an operator indicate by-wire control, the controller module is configured to direct the control signals to the at least one control unit,
   wherein, when the instructions or the input from the operator indicate manual control or when the controller module detects a fault, the controller module is configured to de-energize or interrupt relay signals applied to a signal relay module in order to permit the sensor signals to be directed to the at least one control unit without modification, and
   wherein the device interface is configured to direct communication back to the external device to provide a report indicating the mode of operation and information accessible from at least one of the one or more vehicle sensors.

2. The system of claim 1, wherein the system further comprises a communication network comprising at least one of a controller area network ("CAN") bus and a serial peripheral interface ("SPI") bus that connects the controller module to the device interface and the control interface.

3. The system of claim 1, wherein the system further comprises at least one signal generator module in communication with the controller module that is configured to generate the control signals.

4. The system of claim 3, wherein the at least one signal generator module is configured to generate analog signals, digital signals, and controller area network ("CAN") signals.

5. The system of claim 3, wherein the signal relay module is in communication with the controller module and is configured to transfer the control signals or the sensor signals based on signals provided by the controller module or the at least one signal generator module.

6. The system of claim 5, wherein the signal relay module is a relay configured to directly transfer sensor signals to the at least one control unit on the vehicle when the system is operated in a manual mode.

7. The system of claim 1, wherein the system further comprises at least one of a gear sensor, a throttle sensor, a brake sensor, a turn signal sensor, and a steering sensor.

8. The system of claim 1, wherein the system further comprises a signal processing module configured to receive and modify the sensor signals from the one or more vehicle sensors.

9. The system of claim 1, wherein the controller module is further configured to determine the input from the operator by analyzing the sensor signals.

10. The system of claim 1, wherein the system further comprises a fault module configured to detect the fault associated with the system.

11. The system of claim 10, wherein the fault module is further configured to monitor at least the controller module.

12. The system of claim 10, wherein the fault module is further configured to provide an indication corresponding to the fault detected using an output.

13. The system of claim 1, wherein the controller module is further configured to selectively direct the control signals or the sensor signals to at least one actuator on the vehicle.

14. A system for controlling a vehicle, the system comprising:
   a device interface configured to communicate instructions, including signals and messages, to and from an external device, the external device comprising a manual input device;
   a control interface configured to receive sensor signals from one or more vehicle sensors;
   a fault module configured to detect a fault in the system;
   a controller module in communication with the device interface, the control interface and the fault module, wherein the controller module is configured to carry out steps for:
      generating control signals based on the instructions received;
      analyzing the sensor signals to identify an input from an operator;
      determining a mode of operation for the system in accordance with the input and the fault; and
      selectively directing the control signals or the sensor signals to at least one control unit on the vehicle based on the mode of operation; and
   a signal processing module in communication with the controller module, the signal processing module configured to receive and modify the sensor signals and to communicate the modified sensor signals to the controller module,
   wherein the controller module is further configured to determine a mode of operation based on at least one of the instructions, input from an operator, or a fault associated with the system,
   wherein, when the instructions or the input from an operator indicate by-wire control, the controller module is configured to direct the control signals to the at least one control unit,
   wherein, when the instructions or the input from the operator indicate manual control or when the controller module detects a fault, the controller module is configured to de-energize or interrupt relay signals applied to a signal relay module in order to permit the sensor signals to be directed to the at least one control unit without modification, and
   wherein the device interface is configured to direct communication back to the external device to provide a report indicating the mode of operation and information accessible from at least one of the one or more vehicle sensors.

15. The system of claim 14, wherein the system further comprises at least one signal generator module in communication with the controller module that is configured to generate the control signals.

16. The system of claim 15, wherein the at least one signal generator is configured to generate analog signals, digital signals, and controller area network ("CAN") signals.

17. The system of claim 14, wherein the signal relay module is in communication with the controller module and is configured to transfer the control signals or the sensor signals based on signals provided by the controller module or the at least one signal generator.

18. The system of claim 14, wherein the system further comprises at least one of a gear sensor, a throttle sensor, a brake sensor, a turn signal sensor, and a steering sensor.

19. A method for controlling a vehicle using a system, the method comprising:
- receiving, by a device interface, instructions for controlling a vehicle from an external device, the external device comprising a manual input device;
- acquiring sensor signals from one or more vehicle sensors;
- determining, by a controller module, a mode of operation based on the instructions and the sensor signals, input from an operator, or a fault associated with the system;
- sending, by the controller module, a serial peripheral interface message to a digital-to-analog voltage integrated circuit configured to generate analog voltage control signals;
- when the instructions or the input from an operator indicate by-wire control, directing, by the controller module, the control signals to at least one control unit on the vehicle,
- when the instructions or the input from the operator indicate manual control or when the controller module detects a fault, de-energizing or interrupting, by the controller module, relay signals applied to a signal relay module in order to permit the sensor signals to be directed to the at least one control unit without modification, and
- directing, by the device interface, communication back to the external device to provide a report indicating the mode of operation and information accessible from at least one of the one or more vehicle sensors.

20. The method of claim 19, wherein the method further comprises generating the control signals based on the instructions.

21. The method of claim 19, wherein the method further comprises analyzing the acquired sensor signals to determine an input from an operator.

22. The method of claim 21, wherein the method further comprises directing the control signals to the at least one control unit if the input is not detected and the instructions indicate a by-wire mode.

23. The method of claim 19, wherein the method further comprises directing the control signals to the at least one control unit if the fault is not detected.

24. The method of claim 19, wherein the method further comprises generating a report if the fault is detected.

25. The method of claim 19, wherein the method further comprises selectively directing the control signals or the sensor signals to at least one actuator on the vehicle.

26. The method of claim 19, wherein the selectively directing step comprises the controller module energizing a signal relay module to allow the control signals to be directed to the at least one control unit.

* * * * *